(12) United States Patent
Wang et al.

(10) Patent No.: US 10,573,934 B2
(45) Date of Patent: Feb. 25, 2020

(54) BATTERY PACK AND METHOD OF MANUFACTURING THE SAME

(71) Applicant: Samsung SDI Co., Ltd., Yongin-si, Gyeonggi-do (KR)

(72) Inventors: Han Jun Wang, Yongin-si (KR); Dae Yon Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 337 days.

(21) Appl. No.: 15/354,441

(22) Filed: Nov. 17, 2016

(65) Prior Publication Data

US 2017/0141437 A1   May 18, 2017

(30) Foreign Application Priority Data

Nov. 18, 2015   (KR) .......................... 10-2015-0162007

(51) Int. Cl.
| | |
|---|---|
| *H01M 10/42* | (2006.01) |
| *H01M 2/10* | (2006.01) |
| *H01M 2/20* | (2006.01) |
| *H01M 2/30* | (2006.01) |
| *H01M 2/34* | (2006.01) |
| *H01M 10/04* | (2006.01) |

(52) U.S. Cl.
CPC ....... *H01M 10/425* (2013.01); *H01M 2/1022* (2013.01); *H01M 2/1077* (2013.01); *H01M 2/204* (2013.01); *H01M 2/206* (2013.01); *H01M 2/30* (2013.01); *H01M 2/348* (2013.01); *H01M 10/04* (2013.01); *H01M 2010/4271* (2013.01); *H01M 2200/00* (2013.01); *H01M 2220/20* (2013.01); *H01M 2220/30* (2013.01)

(58) Field of Classification Search
CPC ......... H01M 10/425; H01M 2/20; H01M 2/30
See application file for complete search history.

(56) References Cited

U.S. PATENT DOCUMENTS

| | | | |
|---|---|---|---|
| 9,059,454 B2 | 6/2015 | Moon et al. | |
| 2012/0121939 A1* | 5/2012 | Yoo | ........................... G01K 1/14 429/7 |
| 2013/0266823 A1* | 10/2013 | Lee | ......................... H01M 2/34 429/7 |
| 2016/0126511 A1* | 5/2016 | Park | .................... H01M 2/0404 429/7 |

FOREIGN PATENT DOCUMENTS

| | | |
|---|---|---|
| JP | 2004-247198 A | 9/2004 |
| KR | 10-2014-0034390 A | 3/2014 |

* cited by examiner

*Primary Examiner* — James Lee
(74) *Attorney, Agent, or Firm* — Knobbe, Martens, Olson & Bear, LLP

(57) ABSTRACT

Disclosed is a battery pack including: a plurality of serially connected cells; a protection circuit module electrically connected with the plurality of cells; and a plurality of lead tabs configured to electrically connect the plurality of cells to the protection circuit module, in which the protection circuit module includes a plurality of connection portions, which is arranged in a row and connected with the plurality of lead tabs, respectively, and the plurality of lead tabs overlaps in an order in which the plurality of connection portions is arranged, so that an assembling process time is decreased.

16 Claims, 13 Drawing Sheets

BATTERY PACK AND METHOD OF MANUFACTURING THE SAME

RELATED APPLICATIONS

This application claims priority to and the benefit of Korean Patent Application No. 10-2015-0162007, filed on Nov. 18, 2015, in the Korean Intellectual Property Office, the entire contents of which are incorporated herein by reference in their entirety.

BACKGROUND

Field

The present invention relates to a battery pack and a method of manufacturing the same, and more particularly, to a battery pack including a secondary battery, and a method of manufacturing the same.

Description of the Related Art

In general, a secondary battery is a battery, which is chargeable and dischargeable to be repeatedly usable. The secondary battery may be charged with solar energy and other new generative energy, as well as an existing power system, such as a power plant, as an energy source. The secondary battery may be used as an energy source for a vehicle or large equipment requiring a supply of power, as well as an electronic device, such as a mobile phone, a notebook computer, or a camcorder.

As necessary, in order to implement a high output or high capacity secondary battery, a plurality of unit cells may be connected in serial and/or in parallel. Further, as necessary, a controller controlling charging and/or discharging of the secondary battery and preventing overcharging and/or overdischarging of the secondary battery may be further included.

SUMMARY OF CERTAIN INVENTIVE ASPECTS

The present invention is conceived to provide a battery pack, in which a processing time is decreased when a plurality of cells is electrically connected to a protection circuit module, and a method of manufacturing the same.

An exemplary embodiment of the present invention provides a battery pack, including: a plurality of electrically connected cells; a protection circuit module electrically connected with the plurality of cells; and a plurality of lead tabs configured to electrically connect the plurality of cells to the protection circuit module, in which the protection circuit module includes a plurality of connection portions, which is arranged in a row and connected with the plurality of lead tabs, respectively, and the plurality of lead tabs overlaps in an order in which the plurality of connection portions is arranged.

The plurality of connection portions may include a first connection portion, a second connection portion, a third connection portion, and a fourth connection portion, which are arranged in the order.

The plurality of lead tabs may include: a first lead tab connected to the first connection portion; a second lead tab, which overlaps on the first lead tab and is connected to the second connection portion; a third lead tab, which overlaps on the second lead tab and is connected to the third connection portion; and a fourth lead tab, which overlaps on the third lead tab and is connected to the fourth connection portion.

The plurality of cells may include: a first cell having a side surface, to which the protection circuit module is fixed; a second cell, which is disposed on the same plane as that of the first cell, and is serially connected with the first cell; and a third cell, which is stacked on the second cell, and is serially connected with the second cell.

Each of the plurality of cells may include a terminal surface provided with a first electrode terminal and a second electrode terminal. A terminal surface of the first cell and a terminal surface of the second cell may face each other. A terminal surface of the second cell and a terminal surface of the third cell may be arranged in the same direction.

The first connection portion may be a first electrode of the plurality of connected cells, and the fourth connection portion may be a second electrode of the plurality of connected cells.

A first electrode of the first cell may be electrically connected with the first lead tab, a second electrode of the first cell and a first electrode of the second cell may be electrically connected by the second lead tab, a second electrode of the second cell and a first electrode of the third cell may be electrically connected by the third lead tab, and a second electrode of the third cell may be electrically connected with the fourth lead tab.

Each of the first to fourth lead tabs may be bent at a corner of the first cell.

The first to fourth lead tabs may overlap each other on a side surface of the first cell, and a length of the first lead tab extending along the side surface of the first cell may be largest, and a length of the fourth lead tab extending along the side surface of the first cell may be smallest.

Each of the plurality of cells may further include: a terminal surface provided with a first electrode terminal and a second electrode terminal; and a bottom surface positioned at an opposite side of the terminal surface. The side surface of the first cell may be positioned between the terminal surface of the first cell and the bottom surface of the first cell.

A surface of each of the plurality of lead tabs may be insulated and coated.

Another exemplary embodiment of the present invention provides a method of manufacturing a battery pack, including: stacking a plurality of cells; connecting a lead tab to the plurality of cells; and connecting the plurality of connected cells to a protection circuit module, in which the connecting the plurality of connected cells to the protection circuit module includes connecting the plurality of connected cells to the protection circuit module in an order, in which the plurality of lead tabs overlaps.

The connecting of the lead tab may include at least one of: electrically connecting a first lead tab to a first electrode of a first cell; electrically connecting a second electrode of the first cell and a first electrode of a second cell through a second lead tab; electrically connecting a second electrode of the second cell and a first electrode of a third cell through a third lead tab; and electrically connecting a fourth lead tab to a second electrode of the third cell.

The method may further include overlapping the plurality of lead tabs connected to the plurality of cells. The overlapping of the plurality of lead tabs may include: overlapping the second lead tab on the first lead tab; overlapping the third lead tab on the second lead tab; and overlapping the fourth lead tab on the third lead tab.

The overlapping of the third lead tab on the second lead tab may include rotating the first cell with respect to the second cell so that a terminal surface of the first cell faces a terminal surface of the second cell.

According to the exemplary embodiment of the present invention, the plurality of lead tabs is arranged in a row according to a welding order, so that a process time is decreased.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Figure 1:
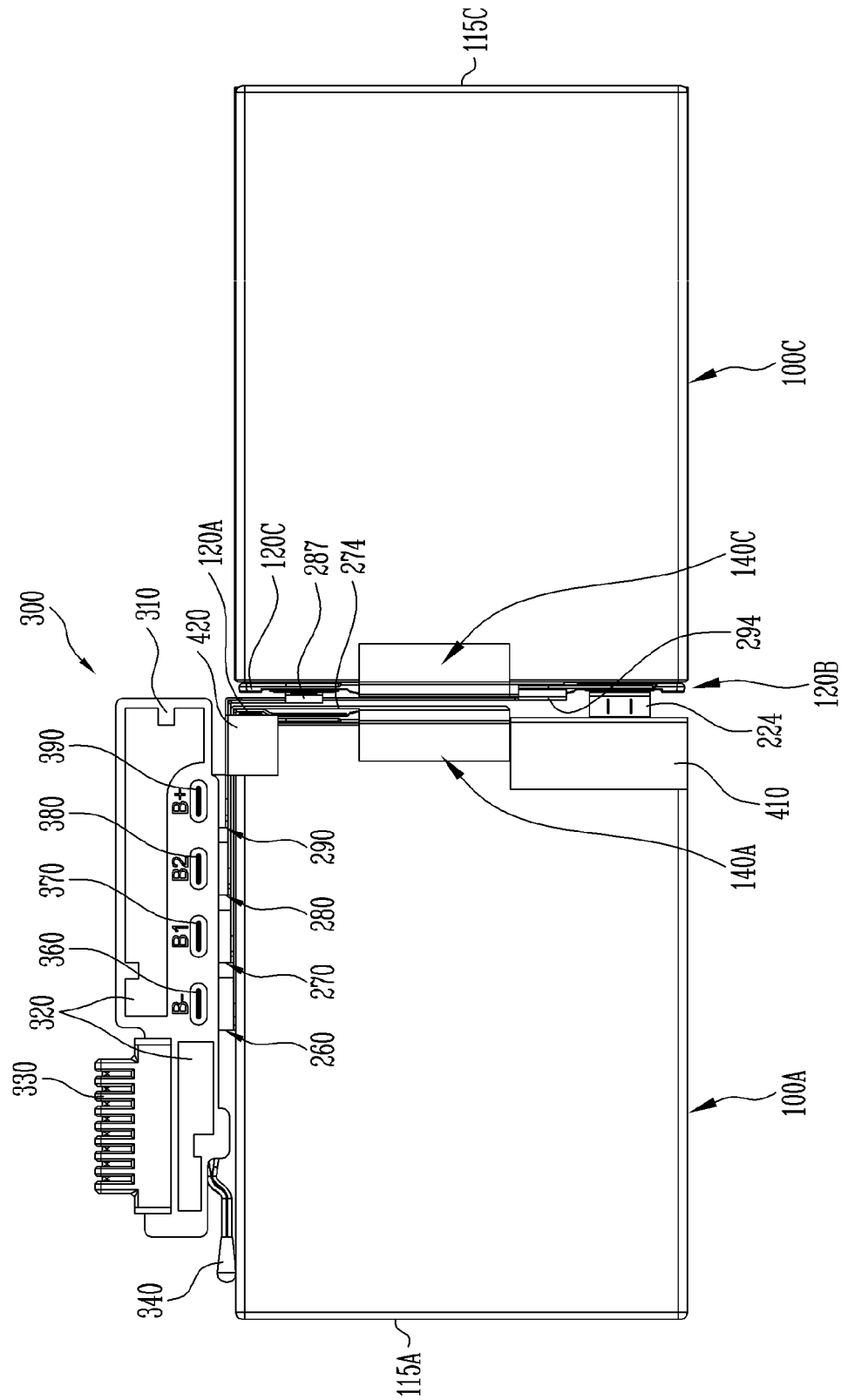
FIG. 1 is a top view of an exemplary embodiment of the present invention.

Various advantages and features of the present disclosure and methods accomplishing thereof will become apparent from the following detailed description of exemplary embodiments with reference to the accompanying drawings. However, the present invention is not limited to exemplary embodiments disclosed below and may be implemented in various forms, and when one constituent element referred to as being "connected to" another constituent element, one constituent element can be directly coupled to or connected to the other constituent element, but intervening elements may also be present. Further, an irrelevant part to the present invention is omitted to clarify the description of the present invention, and like reference numerals designate like elements throughout the specification.

The exemplary embodiments will be described in detail with reference to the accompanying drawings so that those skilled in the art may easily carry out the present invention. As long as a battery is capable of being charged or discharged, the battery is acceptable as a secondary battery mentioned in the present invention.

The exemplary embodiments will be described in detail with reference to the accompanying drawings so that those skilled in the art may easily carry out the present invention. As long as a battery is capable of being charged or discharged, the battery is acceptable as a secondary battery mentioned in the present invention.

Figure 2:
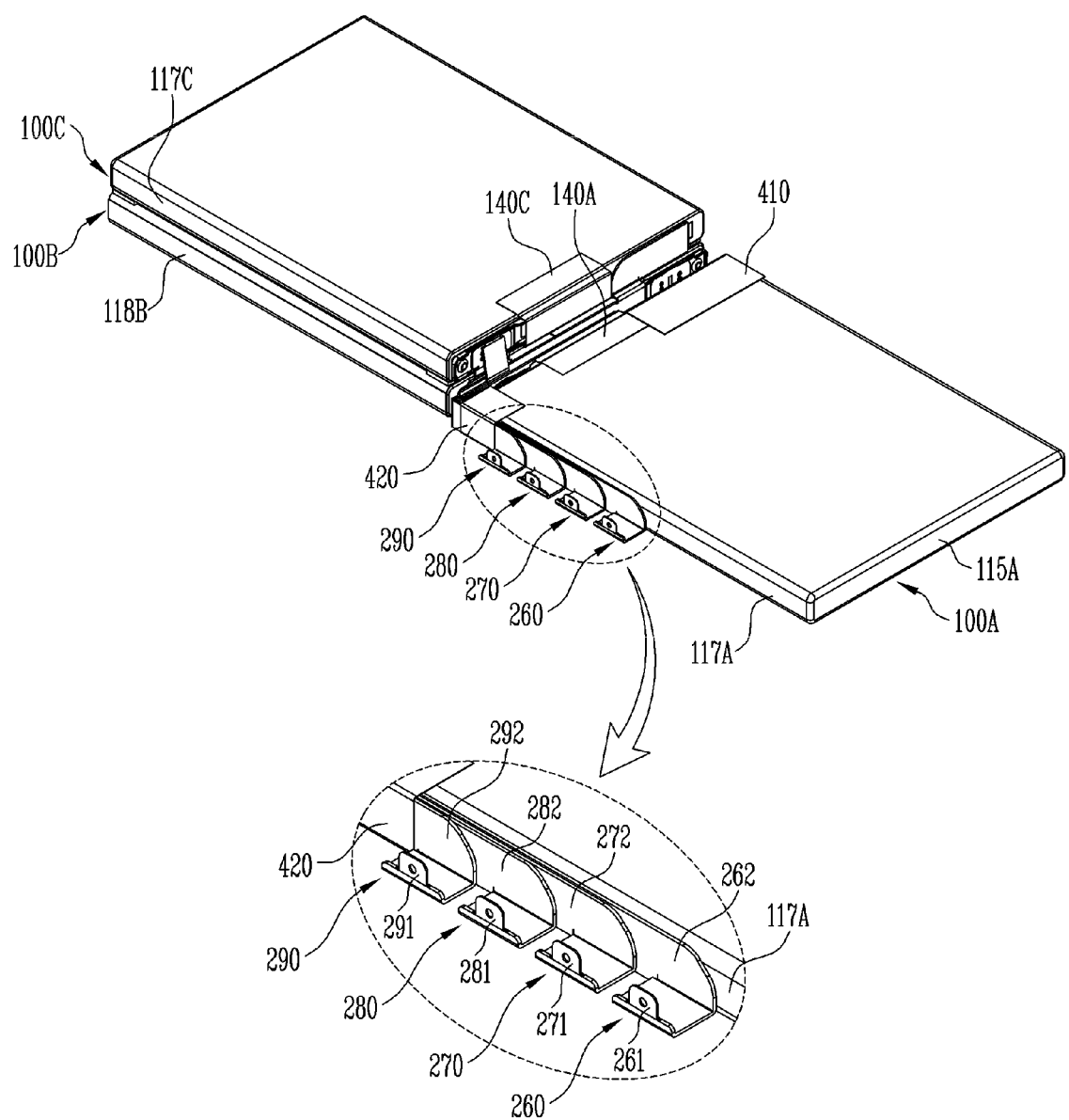
FIG. 2 is a perspective view of a protection circuit module in a separated state in the exemplary embodiment of FIG. 1.

FIG. 1 is a top view of an exemplary embodiment of the present invention, and FIG. 2 is a perspective view of a protection circuit module in a separated state in the exemplary embodiment of FIG. 1. The exemplary embodiment of the present invention includes a plurality of cells 100A, 100B, 100C, a protection circuit module 300, a plurality of lead tabs 260, 270, 280, and 290, which electrically connects the plurality of cells to the protection circuit module, and a plurality of insulating members 410 and 420.

The plurality of cells 100A, 100B, and 100C includes a first cell 100A, a second cell 100B, and a third cell 100C. The plurality of cells is the chargeable/dischargeable secondary battery. The plurality of cells has the same configuration and is indicated with reference numeral 100 in FIG. 3. The configuration of the cell 100 will be described in detail with reference to FIG. 3.

In the cell 100, an electrode assembly is sealed in a case 110 together with an electrolyte, and a first electrode terminal 111 and a second electrode terminal 112 are provided on one surface 113 of the cell 100. The electrode assembly (not illustrated) may be formed by sequentially stacking a first electrode, a separator, and a second electrode, or sequentially stacking and winding a first electrode, a separator, and a second electrode. The first electrode is electrically connected with the first electrode terminal 111, and the second electrode is electrically connected with the second electrode terminal 112.

The first electrode and the second electrode have opposite polarities. In the present exemplary embodiment, the first electrode is a negative electrode and the second electrode is a positive electrode.

The case 110 of the cell approximately has a hexagonal shape, and has two relatively wide surfaces and a boundary connecting the two surfaces. The two relatively wide surfaces face each other. The boundary connects two surfaces at a boundary of the relatively wide surface, and is generally vertical to the relatively wide surface.

The boundary of the case 110 includes four relatively narrow surfaces 113, 115, 117, and 118. A surface provided with the first electrode terminal 111 and the second electrode terminal 112 among the four surfaces of the boundary of the case 110 is called a terminal surface 113 for convenience of the description. Further, a surface positioned at an opposite side of the terminal surface 113 is called a bottom surface 115 for convenience of the description. Further, surfaces between the terminal surface and the bottom surface among the four surfaces of the boundary are called side surfaces 117 and 119.

The side surfaces 117 and 118 of the case 110 are generally vertical to the two relatively wide surfaces, and are also generally vertical to the terminal surface 113 and the bottom surface 115. For convenience of the description, the side surface adjacent to an outer lead 134 among the two surfaces of the case 110 is called a first side surface 117, and a side surface adjacent to the second electrode terminal 112 is called a second side surface 118.

Optionally, a temperature element assembly 120 may be electrically connected to the first electrode terminal 111. When a temperature of the cell 100 exceeds a predetermined value, the temperature element assembly is cut and blocks a current. The temperature element assembly 120 includes a temperature element 131, inner and outer leads 133 and 134 provided at both ends of the temperature element, respectively, and a supporting member 121 supporting the temperature element and the leads.

The inner lead 133 electrically connects the temperature element 131 to the first electrode terminal 111. The outer lead 134 is connected to the temperature element 131 at an opposite side of the inner lead 133 and is fixed to the supporting member 121 to substantially serve as an external terminal of the first electrode terminal. The supporting member 121 is an insulating member, and the inner lead 133 and the first electrode terminal 111 are welded through a hole 122 provided in a plate-shaped body 125.

The temperature element 131 welded to each of the inner lead 133 and the outer lead 134 is seated on the supporting member 121. Fixing protrusions 123 and 124 for fixing the inner lead 133 and the outer lead 134 are provided at both ends of the supporting member 121, respectively. A hole is provided in each of the inner lead 133 and the outer lead 134, and the fixing protrusions 123 and 124 are inserted into the holes, so that the outer and inner leads are fixed to the supporting member 121. The fixing protrusions 123 and 124 become larger than a diameter of the hole of each of the outer lead and the inner lead by heat fusion, so that the outer and inner leads may be fixed to the supporting member.

The configuration of the temperature element assembly is illustrative purposes, and the temperature element assembly may have any configuration if the configuration blocks a current when the temperature is equal to or larger than a predetermined value.

Figure 3:
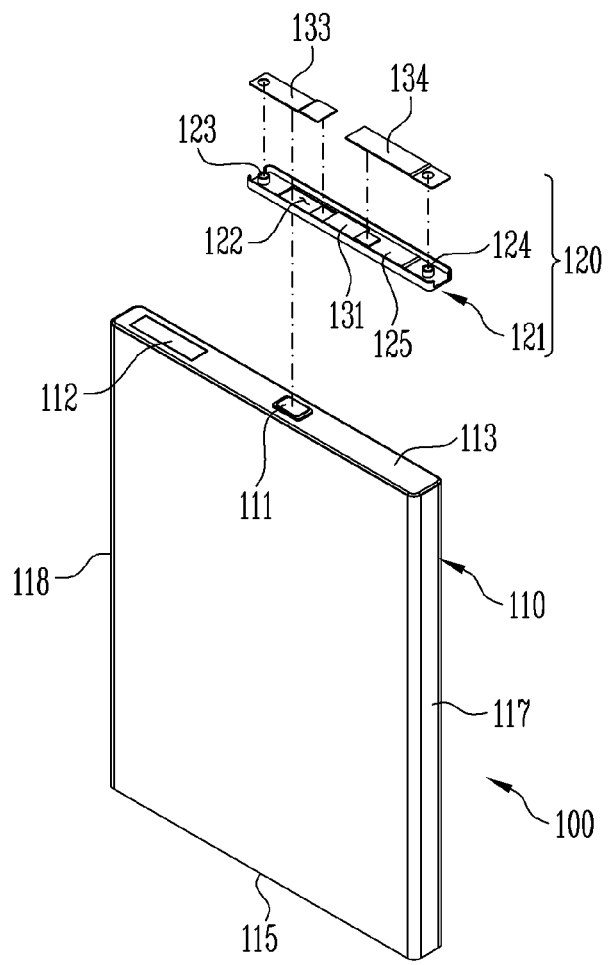
FIG. 3 is an exploded perspective view of a cell and an electrode terminal assembly provided in the exemplary embodiment of FIG. 1.

Each part of the cell 100 illustrated in FIG. 3 is discriminated by assigning an alphabet letter assigned to each cell. For example, the temperature element assembly of the first cell 100A indicated with reference numeral 120A in FIG. 1 substantially has the same configuration as that of the temperature element assembly of the cell 100 of FIG. 3. Similarly, the temperature element assembly 120B of the second cell 100B and the temperature element assembly 120C of the third cell have the same configuration as that of the temperature element assembly 120 of the cell 100 of FIG. 3. By the aforementioned manner, it can be understood that a case where alphabet letter A is attached to the number indicated in FIG. 3 corresponds to a corresponding configuration of the first cell, a case where alphabet letter B is attached to the number indicated in FIG. 3 corresponds to a corresponding configuration of the second cell, and a case where alphabet letter C is attached to the number indicated in FIG. 3 corresponds to a corresponding configuration of the third cell.

The first cell 100A and the second cell 100B are laid on the same plane, and the terminal surface 113A of the first cell 100A is disposed so as to face the terminal surface 113B of the second cell 100B. The third cell 100C is stacked on the second cell 100B, and the terminal surface 113C of the third cell 100C is disposed so as to head in the same direction as that of the terminal surface 113B of the second cell 100B.

The first to third cells 100A, 100B, and 100C are serially connected by second and third lead tabs 270 and 280. Particularly, the second electrode terminal 112A of the first cell 100A and the first electrode terminal of the second cell 100B are electrically connected by the second lead tab 270. Further, the second electrode terminal 112B of the second cell 100B and the first electrode terminal of the third cell 100C are electrically connected by the third lead tab 280.

The first lead tab 260 is electrically connected with the first electrode terminal of the first cell 100A to serve as a first electrode B− of the three serially connected cells 100A, 100B, and 100C. The fourth lead tab 290 is electrically connected with the second electrode terminal 112C of the third cell 100C to serve as a second electrode B+ of the three serially connected cells 100A, 100B, and 100C.

Figure 4:
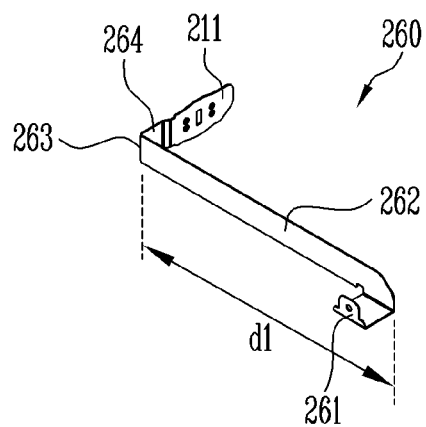
FIG. 4 is a perspective view of a first lead tab provided in the exemplary embodiment of FIG. 1.
Figure 5:
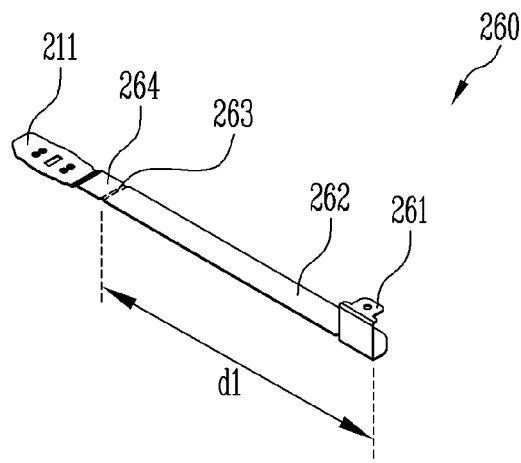
FIG. 5 is a perspective view of a state in which the first lead tab of FIG. 4 is not connected to the cell.

FIG. 4 is a perspective view of the first lead tab, and FIG. 5 is a perspective view of a state before the first lead tab is connected to the first electrode terminal of the first cell for convenience of the description.

The first lead tab 260 includes a first connection tab 211 connected to the first electrode terminal of the first cell and a first extension tab extended from the first connection tab 211 to the protection circuit module 300. The first extension tab is bent at a corner of the first cell 100A and is extended along the first side surface 117A of the first cell 100A, and is inserted into a first connection portion 360 of the protection circuit module 300. A surface of the first extension tab is insulated and coated except for a first insertion portion 261 which is inserted into the first connection portion 360.

The first connection tab 211 is fixed to the outer lead 134A of the first cell 100A to be electrically connected with the first electrode of the first cell 100A. The first connection tab 211 may be fixed to the outer lead 134A of the first cell by welding. Further, the first connection tab 211 may include a circular bead protruding toward the outer lead 134A of the first cell for the easiness of welding. Further, the first connection tab 211 may be provided with a hole between the circular bead.

The first extension tab is extended from the first connection tab 211 to the protection circuit module 300 to electrically connect the first electrode terminal of the first cell to the protection circuit module. The first extension tab is extended along the boundary of the first cell, and is bent at a corner of the first cell.

Particularly, the first extension tab includes a portion 264 extended from the first connection tab 211 to the corner of the first cell along the terminal surface 113A of the first cell, a first bent portion 263 bent at the corner of the first cell, a portion 262 extended from the corner of the first cell to the first connection portion 360 along the first side surface 117A of the first cell, and the first insertion portion 261 fixed to the first connection portion 360. The first insertion portion 261 is provided at an end of the first extension tab and inserted into the first connection portion 360.

The first bent portion 263 of the first extension tab may be provided with recesses at both boundaries in a width direction so as to be easily bent. However, the present invention is not limited thereto, and the first bent portion 263 may not include the recess. The characteristic that the boundary of the bent portion of the extension tab may be provided or may not be provided with the recess is equal for the second to fourth lead tabs 270, 280, and 290 which will be described below.

Figure 6:
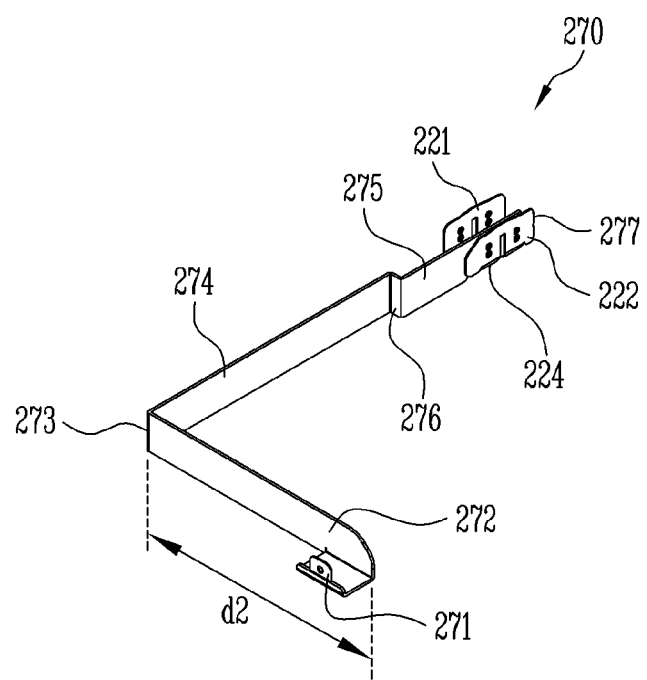
FIG. 6 is a perspective view of a second lead tab provided in the exemplary embodiment of FIG. 1.
Figure 7:
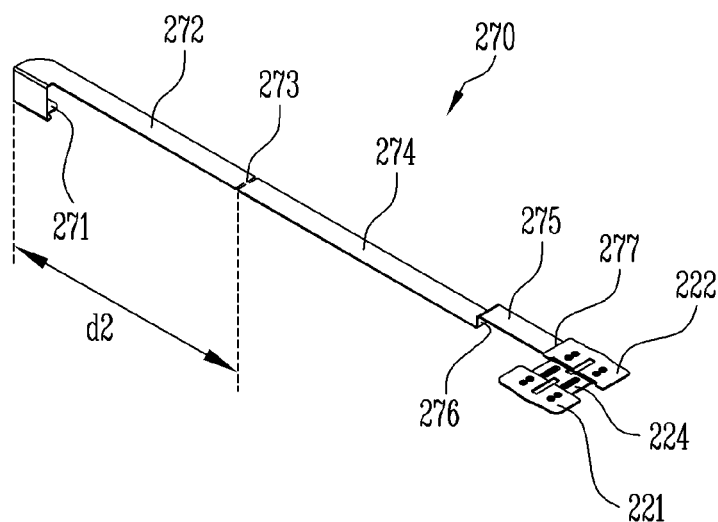
FIG. 7 is a perspective view of a state in which the second lead tab of FIG. 6 is not connected to the cell.

FIG. 6 is a perspective view of the second lead tab, and FIG. 7 is a perspective view of a state before the second lead tab is connected to the second electrode terminal of the first cell and the first electrode terminal of the second cell for convenience of the description.

The second lead tab 270 includes second connection tabs 221, 222, and 224, which electrically connect the second electrode terminal of the first cell and the first electrode terminal of the second cell, and a second extension tab extended from the second connection tab to the protection circuit module 300. The second extension tab is extended along the boundary of the first cell, in such a manner that the second extension tab is extended along the terminal surface 113A of the first cell, bent at the corner of the first cell, and then extended along the first side surface 117A of the first cell.

The second connection tab includes a first cell-side fixing portion 222 fixed to the second electrode terminal 112A of the first cell, a second cell-side fixing portion 221 fixed to the outer lead 314B of the second cell, and a connection portion 224 connecting the first cell-side fixing portion 222 and the second cell-side fixing portion 221. The first cell-side fixing portion 222 and the second cell-side fixing portion 221 of the second connection tab are disposed to face each other. The first cell-side fixing portion 222 and the second cell-side fixing portion 221 are connected by the connection portion 224, so that the second connection tab may generally have a shape bent in a U-shape.

Each of the first cell-side fixing portion 222 and the second cell-side fixing portion 221 of the second connection tab may have a circular bead. Further, each of the first cell-side fixing portion 222 and the second cell-side fixing portion 221 of the second connection tab may further have a hole between the circular bead.

The second extension tab is bent at the first cell-side fixing portion 222 of the second connection tab by 180° and extended to the second connection portion 370 along the boundary of the first cell. The second extension tab is extended to a space between the first cell-side fixing portion 222 and the second cell-side fixing portion 221, and includes a stepped step jaw 276 so as to be extended along a silhouette of the temperature element assembly 120A provided on the terminal surface 113A of the first cell.

Particularly, the second extension tab includes portions 274, 275, 276, and 277 extended from the first cell-side fixing portion 222 of the second connection tab along the terminal surface 113A of the first cell toward the corner of the first cell, a second bent portion 273 bent at the corner of the first cell, a portion 272 extended from the second bent portion to the second connection portion 370 along the first side surface 117A of the first cell, and a second insertion portion 271 fixed to the second connection portion 370. The second insertion portion 271 is provided at an end of the second extension tab and inserted into the second connection portion 370.

The portion of the second extension tab extended along the terminal surface 113A of the first cell includes a portion 277, which is extended from the first cell-side fixing portion 222 of the second connection tab and is almost folded at 180°, a portion 275 extended from the folded portion 277 toward the temperature element assembly 120A of the first cell along the terminal surface 113A of the first cell, a stepped jaw 276 to be further extended along an upper surface of the temperature element assembly 120A of the first cell, and a portion 274 extended from the stepped jaw 276 to the corner of the first cell along the upper surface of the temperature element assembly 120A of the first cell.

A surface of the second extension tab is insulated and coated, except for the second insertion portion 271.

Figure 8:
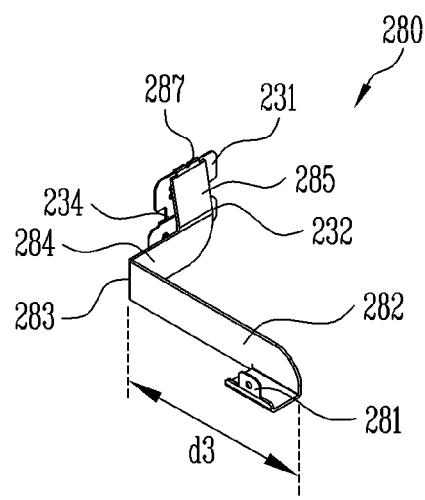
FIG. 8 is a perspective view of a third lead tab provided in the exemplary embodiment of FIG. 1.
Figure 9:
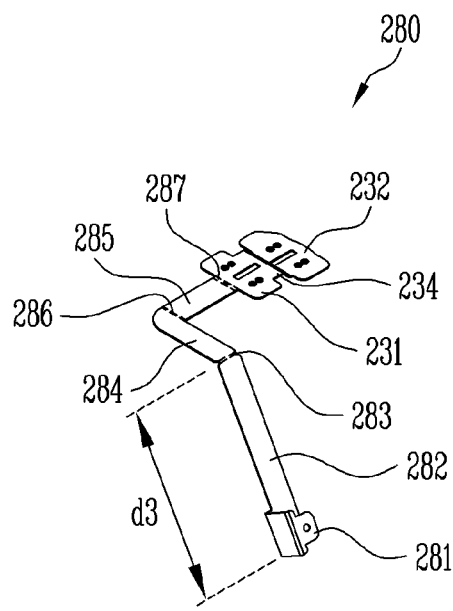
FIG. 9 is a perspective view of a state in which a third lead tab of FIG. 8 is not connected to the cell.

FIG. 8 is a perspective view of the third lead tab, and FIG. 9 is a perspective view of a state before the third lead tab is connected to the second electrode terminal of the second cell and the first electrode terminal of the third cell for convenience of the description.

The third lead tab 280 includes third connection tabs 231, 232, and 234, which electrically connect the second electrode terminal of the second cell and the first electrode terminal of the third cell, and a third extension tab extended from the second connection tab to the protection circuit module 300. The third extension tab is folded toward the terminal surface 113B of the second cell at the third connection tab and overlaps the third connection tab, and is further extended along the boundary of the first cell.

The third connection tab includes a second cell-side fixing portion 232 fixed to the second electrode terminal 112B of the second cell, a third cell-side fixing portion 231 fixed to the outer lead 134C of the third cell, and a connection portion 234 connecting the second cell-side fixing portion 232 and the third cell-side fixing portion 231. The second cell-side fixing portion 232 and the third cell-side fixing portion 231 of the third connection tab may be disposed in parallel to each other, and may have circular beads, respectively. Further, each of the second cell-side fixing portion 232 and the third cell-side fixing portion 231 of the third connection tab may further have a hole between the circular bead.

The third extension tab is bent at 180° at the second cell-side fixing portion 232 of the third connection tab and is extended toward the space between the terminal surface 113B of the second cell and the terminal surface 113A of the first cell, and is extended to the third connection portion 380 along the boundary of the first cell.

The portion of the third extension tab extended from the third connection tab toward the space between the terminal surface of the first cell and the terminal surface of the second cell includes a portion 287, which is extended from the second cell-side fixing portion 232 of the third connection tab and is folded, and a portion 285 extended from the folded portion toward the space between the terminal surface 113B of the second cell and the terminal surface 113A of the first cell, and overlaps the connection portion 234 of the third connection tab.

A portion of the third extension tab extended along the boundary of the first cell includes a portion 284 extended from the overlapping portion 285 to the corner of the first cell along the terminal surface 113A of the first cell, a third bent portion 283 bent at the corner of the first cell, and a third insertion portion 281 fixed to the portion extended from the third bent portion 283 to the third connection portion 380 along the first side surface 117A of the first cell and the third connection portion 380. The third insertion portion 281 is provided at an end of the third extension tab and inserted into the third connection portion 380.

The third extension tab may further include a stepped jaw 286 formed between the overlapping portion 285, which is laid on the terminal surface 113C of the third cell, and the portion 284 extended along the terminal surface 113A of the first cell.

A surface of the third extension tab is insulated and coated, except for the third insertion portion 281.

Figure 10:
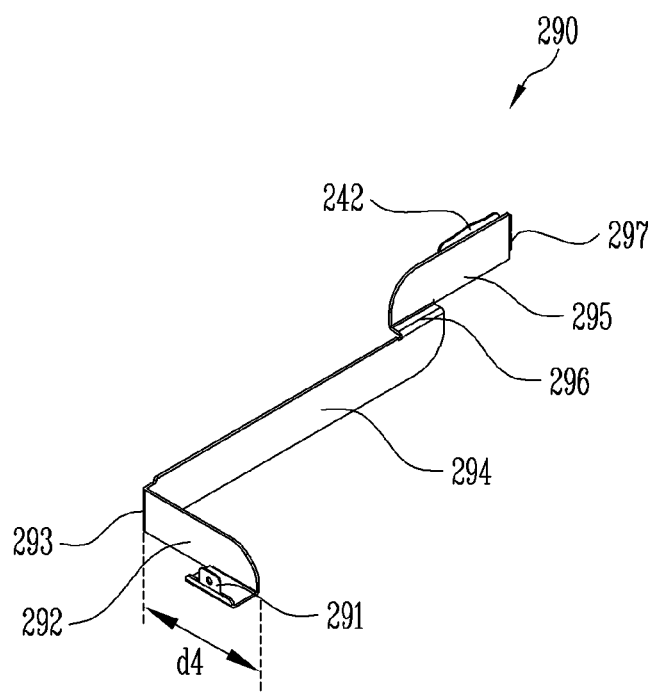
FIG. 10 is a perspective view of a fourth lead tab provided in the exemplary embodiment of FIG. 1.
Figure 11:
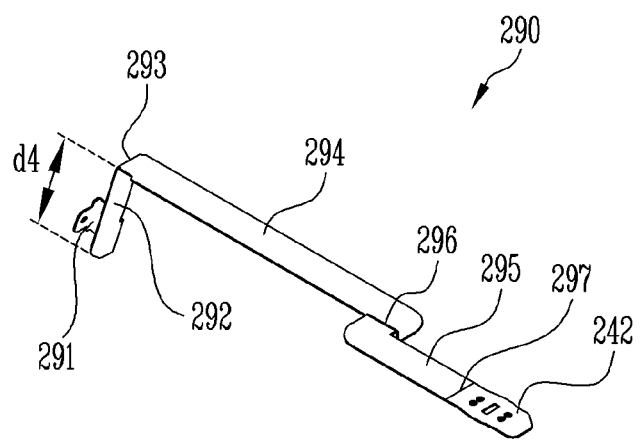
FIG. 11 is a perspective view of a state in which the fourth lead tab of FIG. 10 is not connected to the cell.

FIG. 10 is a perspective view of the fourth lead tab, and FIG. 11 is a perspective view of a state before the fourth lead tab is connected to the second electrode terminal of the third cell for convenience of the description.

The fourth lead tab 290 includes a fourth connection tab 242 connected to the second electrode terminal 112C of the third cell and a fourth extension tab extended from the fourth connection tab to the protection circuit module 300. The fourth extension tab is bent at the fourth connection tab and extended along the terminal surface 113C of the third cell, and then extended to the fourth connection portion 390 along the boundary of the first cell.

The fourth connection tab 242 is fixed to the second electrode terminal 112C of the third cell 100C. The fourth connection tab 242 may be fixed to the second electrode terminal 112C of the third cell by welding. Further, the fourth connection tab 242 may include a circular bead protruding toward the second electrode terminal 112C of the third cell for the easiness of welding. Further, the fourth connection tab 242 may be provided with a hole between the circular bead.

The fourth extension tab includes a portion extended from the fourth connection tab 242 toward the corner of the first cell, a fourth bent portion 293 bent at the corner of the first cell, a portion 292 extended from the fourth bent portion to the fourth connection portion 390, and a fourth insertion portion 291 fixed to the fourth connection portion. The fourth insertion portion 291 is provided at an end of the fourth extension tab and inserted into the fourth connection portion 390.

The portion of the fourth extension tab extended from the fourth connection tab 242 toward the corner of the first cell includes a portion 297, which is extended from the fourth connection tab 242 and is folded at 180°, a portion 295, which is extended from the folded portion toward the terminal surface 113C of the third cell and overlaps the fourth connection tab 242, a portion 294, which is extended in the space between the terminal surface 113A of the first cell and the terminal surface 113B of the second cell along the terminal surface 113A of the first cell, and a stepped jaw 296, which connects the space between the overlapping portion 295 and the portion 294 extended along the terminal surface 113A of the first cell.

A surface of the fourth extension tab is insulated and coated, except for the fourth insertion portion 291.

The first to fourth lead tabs are bent at the corner of the first cell, so that portions thereof extended to the protection circuit module 300 sequentially overlap on the first side surface 117A of the first cell.

A length d1 of the portion 262 of the first extension tab extended to the connection portion 360 along the first side surface 117A of the first cell is largest among the lengths of the portions of the plurality of lead tabs 260, 270, 280, and 290 extended along the first side surface 117A of the first cell. Further, a length d4 of the portion 292 of the fourth extension tab extended to the fourth connection portion 390 along the first side surface 117A of the first cell is smallest among the lengths of the portions of the plurality of lead tabs 260, 270, 280, and 290 extended along the first side surface 117A of the first cell.

A length d2 of the portion 272 of the second extension tab extended to the second connection portion 370 along the first side surface 117A of the first cell is smaller than the length D1 of the corresponding portion 262 of the first extension tab and is larger than a length d3 of the corresponding portion 282 of the third extension tab. The length d3 of the portion 282 of the third extension tab extended to the third connection portion 380 along the first side surface 117A of the first cell is smaller than the length D2 of the corresponding portion 272 of the second extension tab and is larger than the length d4 of the corresponding portion 292 of the fourth extension tab.

Referring to FIG. 2, the first lead tab 260 having the largest length extended along the first side surface 117A of the first cell among the plurality of lead tabs is disposed at the lowermost side, the second lead tab 270 is laid on the first lead tab 260, the third lead tab 280 is laid on the second lead tab 270, and the fourth lead tab 290 is laid on the third lead tab 280. By the aforementioned method, from the first lead tab 260 having the largest length extended along the first side surface 117A of the first cell to the fourth lead tap 290 having the smallest length sequentially overlap on the first side surface 117A of the first cell, so that the first to fourth insertion portions 261, 271, 281, and 291 are arranged in a row without overlapping each other.

The protection circuit module 300 includes a circuit board 310, the plurality of connection portions 360, 370, 380, and 390 provided on the circuit board and connected with the plurality of lead tabs, a plurality of insulating tapes 320 attached onto the circuit board, and a connector 330 electrically connecting the protection circuit module to the outside.

The plurality of connection portions 360, 370, 380, and 390 includes the first connection portion 360, the second connection portion 370, the third connection portion 380, and the fourth connection portion 390, which are sequentially arranged in a row. The first connection portion corresponds to the first electrode B− of the serially connected first to third cells, and the fourth connection portion corresponds to the second electrode B+ of the serially connected first to third cells.

The circuit board 310 is laid on the same plane as that of the first cell 100A, and is disposed to be adjacent to the first side surface 117A of the first cell. The first to fourth connection portions are positioned to be close to a boundary of the circuit board 310 facing the first side surface 117A of the first cell, and are arranged along the boundary of the circuit board 310 in a row.

A disposition order of the first to fourth connection portion is the same as an order in which the first to fourth lead tabs 260, 270, 280, and 290 are connected with the protection circuit module 300. The first to third cells 100A, 100B, and 100C, which are serially connected with each other, are serially connected with each other by the plurality of lead tabs, and the first lead tab corresponds to the first electrode of the plurality of serially connected cells, and the fourth lead tab corresponds to the second electrode of the plurality of serially connected cells, and each of the first lead tab and the second lead tab is electrically connected to the protection circuit module. Each of the second lead tab and the third lead tab is electrically connected to the protection circuit module for monitoring a voltage between the cells.

During the assembling process, when the plurality of lead tabs 260, 270, 280, and 290 is connected to the first to fourth connection portions 360, 370, 380, and 390, respectively, it is necessary to sequentially connect the plurality of lead tabs 260, 270, 280, and 290 so as to prevent the generation of the wake-up, and the like. In the present invention, the first to fourth insertion portions are arranged in accordance with an order, in which the lead tap is welded to the corresponding connection portion, so that it is possible to rapidly perform the welding.

In order to prevent the generation of the wake-up, the first insertion portion 261 of the first lead tab 260 among the plurality of lead tabs is first welded to the first connection portion 360, the second insertion portion 271 of the second lead tab 270 is next welded to the second connection portion 370, the third insertion portion 281 of the third lead tab 280 is next welded to the third connection portion 380, and the fourth insertion portion 271 of the fourth lead tab 270 is finally welded to the fourth connection portion 390. In the present invention, the insertion portions 261, 271, 281, and 291 of the lead tabs are arranged in the welding order, and the connection portions 360, 370, 380, and 390 are sequentially arranged in response to the positions of the insertion portions, respectively, so that it is possible to rapidly perform the welding in the order.

Figure 12:
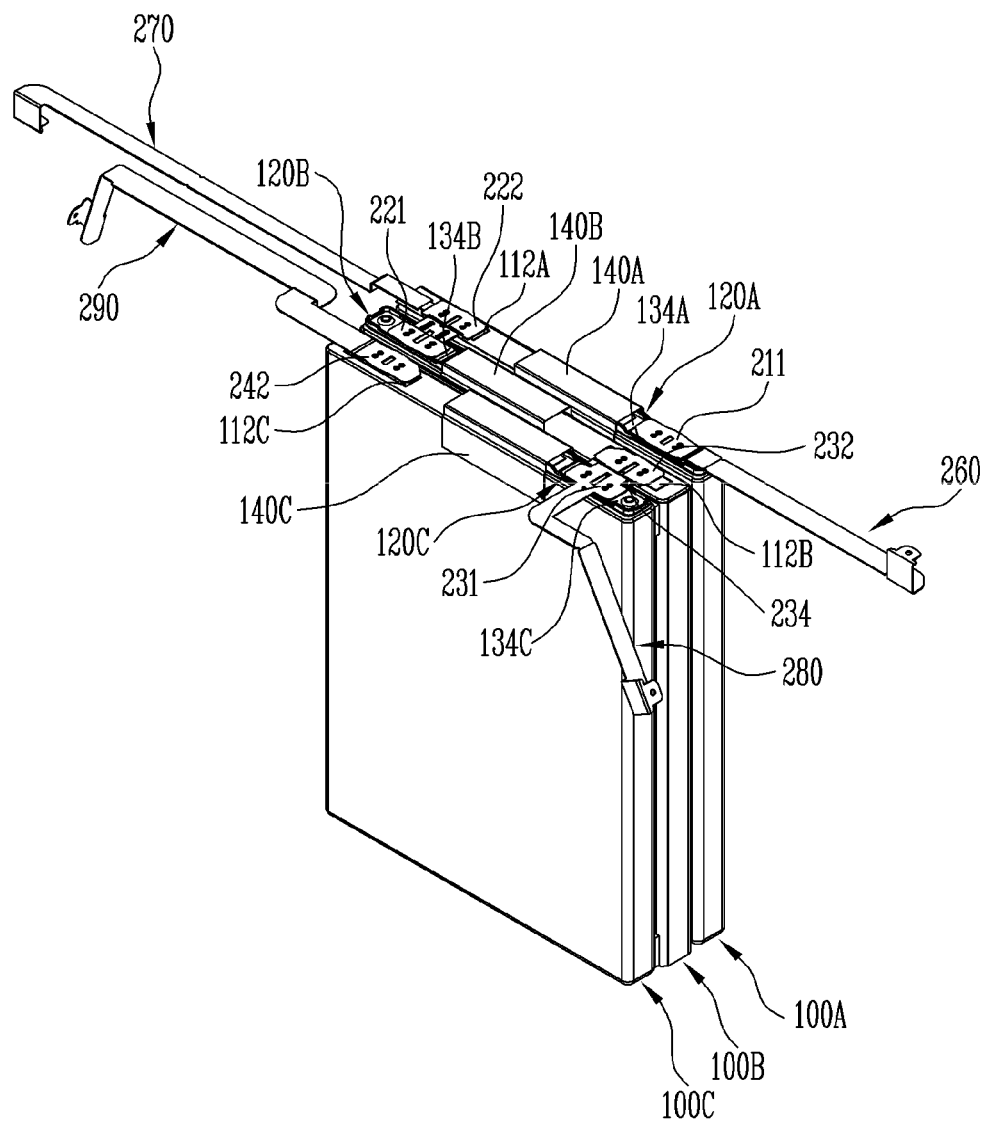
FIG. 12 is a perspective view illustrating a state where a plurality of lead tabs is connected to a plurality of cells.
Figure 15:
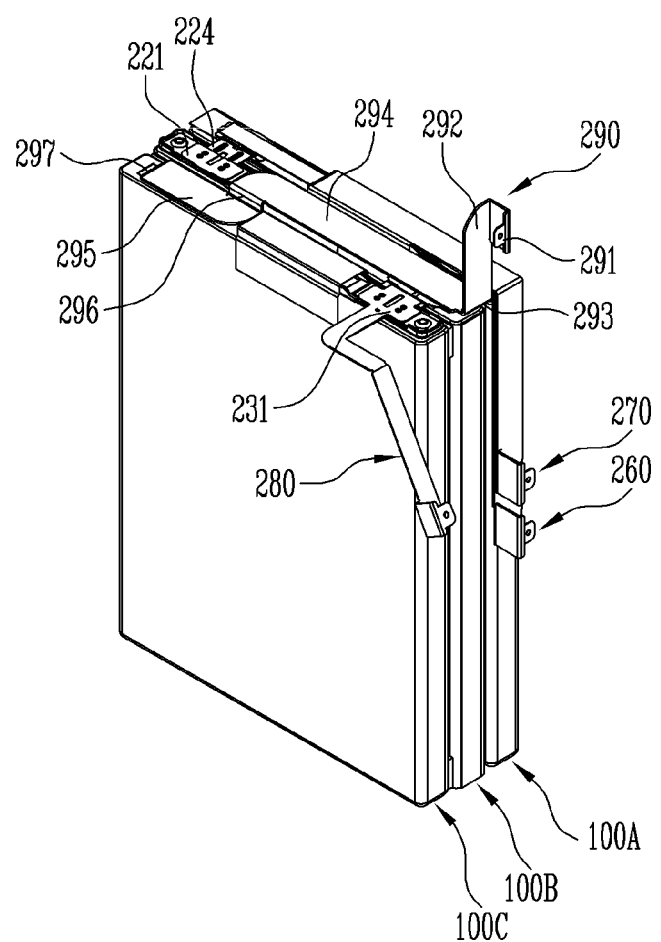
FIG. 15 is a perspective view illustrating a state where the third lead tab connected to the cell is bent.
Figure 16:
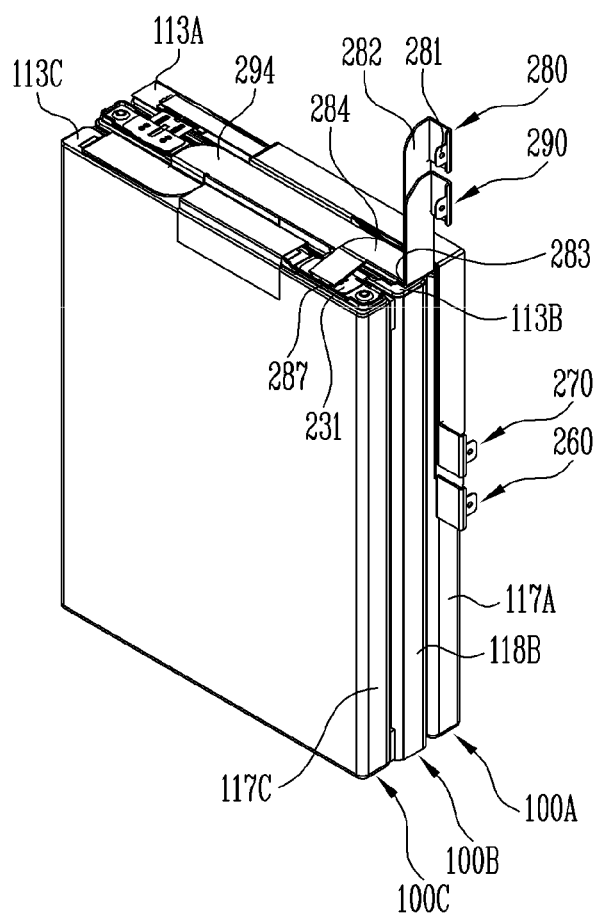
FIG. 16 is a perspective view illustrating a state where the fourth lead tab connected to the cell is bent.
Figure 17:
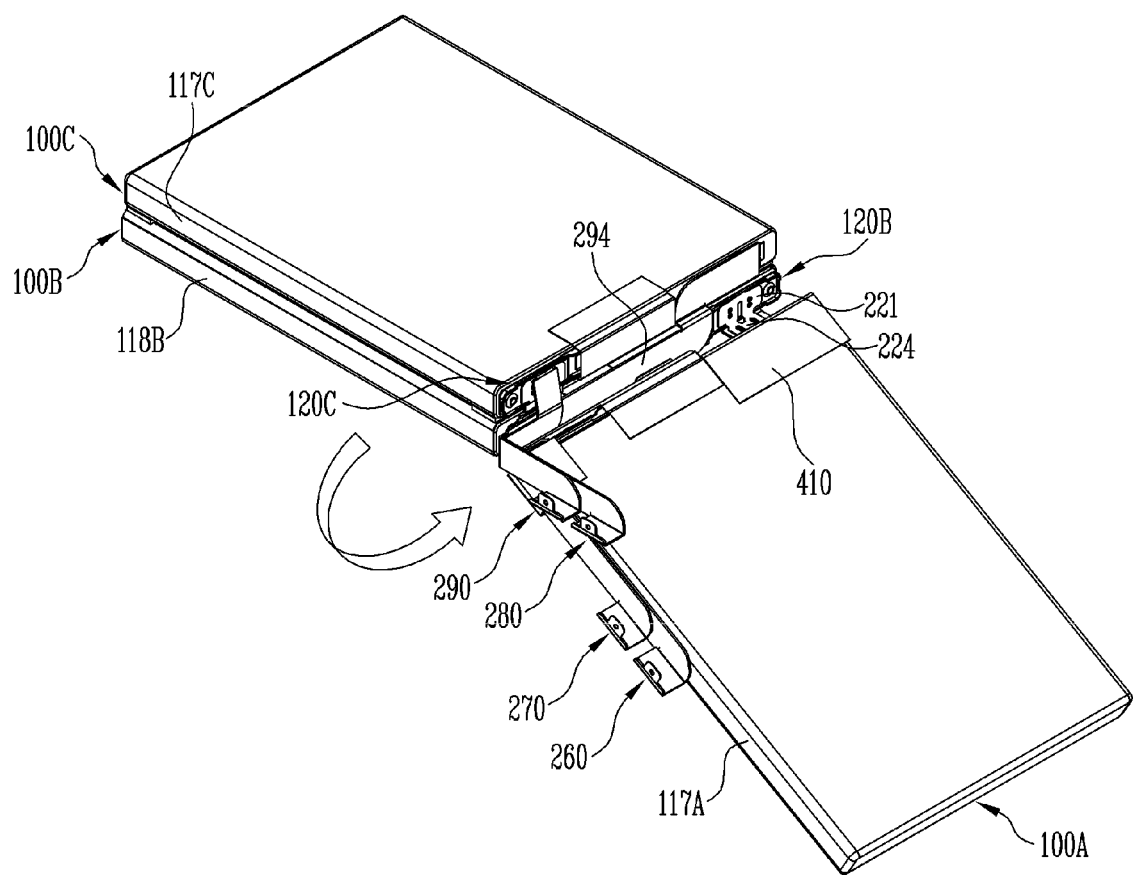
FIG. 17 is a perspective view illustrating a state where the third and fourth lead tabs overlap the first and second lead tabs.

FIG. 12 is a perspective view illustrating a state where a plurality of lead tabs is connected to a plurality of cells, FIGS. 13 to 16 are perspective views for describing a state where the plurality of lead tabs is bent along the boundary of the first cell, and FIG. 17 is a perspective view illustrating a state where the plurality of lead tabs is sequentially arranged on the first side surface 117A of the first cell. A manufacturing method according to an exemplary embodiment of the present invention will be described in detail with reference to FIGS. 12 to 17.

Referring to FIG. 12, the first to third cells 100A, 100B, and 100C are stacked so that the terminal surfaces 113A, 113B, and 113C thereof head the same direction. The second electrode terminal 112A of the first cell 100A and the second electrode terminal 112C of the third cell 100C are arranged so as to be positioned at the same side. The second cell 100B is positioned between the first cell 100A and the third cell 100C, in such a manner that the temperature element assembly 120B of the second cell is arranged to be laid at the same side of the second electrode terminals 112A and 112C of the first cell and the third cell. The first to third cells 100A, 100B, and 100C stacked as described above are serially connected with each other by the plurality of lead tabs.

The first connection tab 211 is welded to the outer lead 134A of the first cell 100A. The second connection tab is welded to the second electrode terminal 112A of the first cell 100A and the outer lead 134B of the second cell. Particularly, the first cell-side fixing portion 222 of the second connection tab is welded to the second electrode terminal 112A of the first cell 100A, and the second cell-side fixing portion 221 of the second connection tab is welded to the outer lead 134B of the second cell 100B.

The third connection tab is welded to the second electrode terminal 112B of the second cell and the outer lead 134C of the third cell. Particularly, the second cell-side fixing portion 232 of the third connection tab is welded to the second electrode terminal 112B of the second cell 100B, and the third cell-side fixing portion 231 of the third connection tab is welded to the outer lead 134C of the third cell 100C. The fourth connection tab 242 is fixed to the second electrode terminal 112C of the third cell.

As described above, the respective lead tabs welded to the electrode terminals corresponding to the first to third cells are sequentially stacked on the first side surface 117A of the first cell, so that the first to fourth insertion portions 261, 271, 281, and 291 are arranged in a row.

Figure 13:
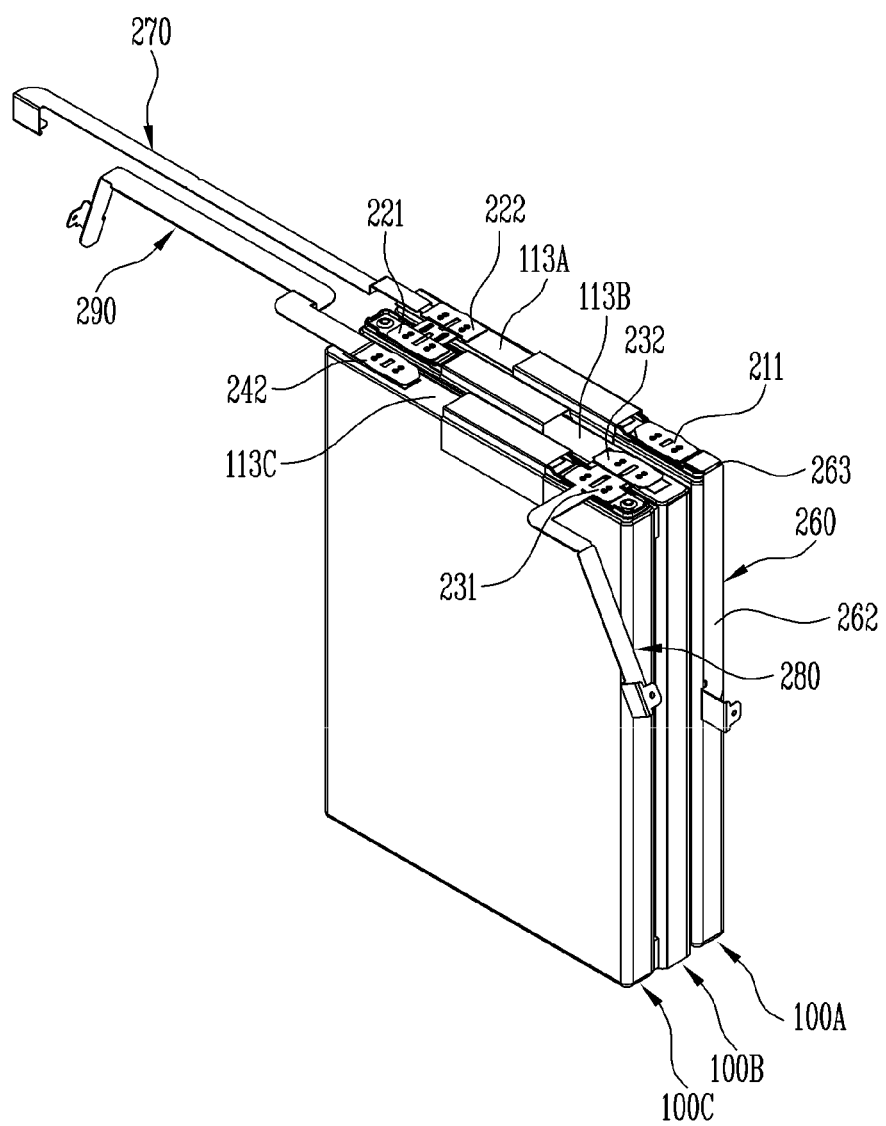
FIG. 13 is a perspective view illustrating a state where the first lead tab connected to the cell is bent.

Referring to FIG. 13, the first lead tab 260 is bent along the corner of the first cell so that the first insertion portion 261 is laid at the side of the first side surface 117A of the first cell. The first lead tab 260 is bent and is seated on the side surface 117A of the first cell, so that the first bent portion 263 is formed.

Figure 14:
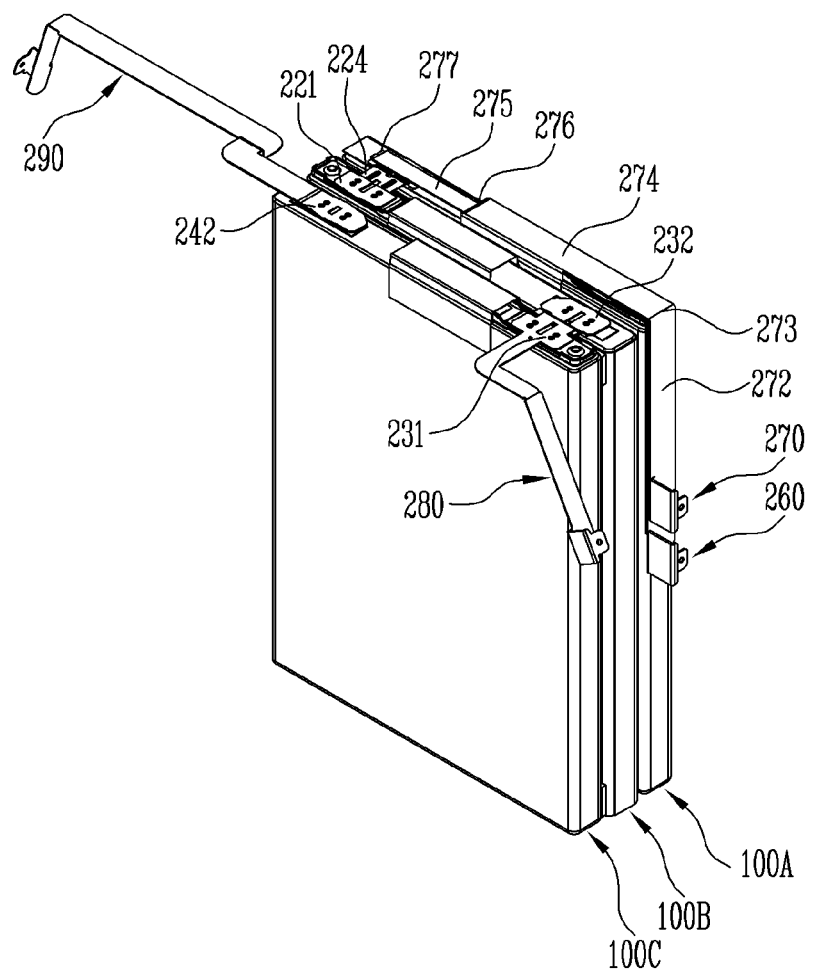
FIG. 14 is a perspective view illustrating a state where the second lead tab connected to the cell is bent.

Referring to FIG. 14, the portion of the second lead tab 270 extended from the second connection tab is folded at almost 180° and seated on the terminal surface 113A of the first cell. The second lead tab 270 is arranged to overlap on the first lead tab 260, and is bent along the corner of the first cell, so that the second bent portion 273 is formed. The portion 272 extended from the second bent portion 273 toward the protection circuit module 300 overlaps on the first lead tab 260, and the second insertion portion 271 is arranged next to the first insertion portion 261.

Referring to FIG. 15, the portion of the fourth lead tab 290 extended from the fourth connection portion 242 is folded at almost 180° and seated on the terminal surface 113C of the third cell and the terminal surface 113B of the second cell. The fourth bent portion 293 is bent in advance before the fourth connection tab 242 is welded to the second electrode terminal of the third cell. However, the present invention is not limited thereto, the fourth bent portion 293 may be formed at a predetermined time before the first cell 100A is spread to be disposed on the same plane as that of the second cell 100B.

Referring to FIG. 16, the portion of the third lead tab 280 extended from the third connection tab is folded at almost 180° and seated on the third connection tab, and the fourth lead tab 290 is simultaneously seated on the portion 294 seated on the terminal surface 113B of the second cell. The third bent portion 283 is bent in advance before the third connection tab 2 is welded to the electrode terminals of the second and third cells. However, the present invention is not limited thereto, the third bent portion 283 may be formed at a predetermined time before the fourth bent portion 293 is formed, or a predetermined time after the fourth bent portion 293 is formed and before the first cell 100A is spread.

In FIG. 16, the third lead tab 280 and the fourth lead tab 290 overlap each other, and the third insertion portion 281 and the fourth insertion portion 291 are arranged in parallel alongside thereof while the folded portion 287 of the third lead tab 280 is formed.

Referring to FIG. 17, the first cell 100A is disposed on the same plane as that of the second cell 100B, and the first cell 100A is rotated by 180° so that the terminal surface 113A of the first cell faces the terminal surface 113B of the second cell. The first cell 100A and the second cell 100B are connected with each other by the second lead tab 270, so that the first cell 100A is rotated by 180° based on the side of the terminal surface 113A of the first cell as a rotation axis. When the first cell is rotated by 180°, the first cell becomes the state illustrated in FIG. 2, and the first to fourth insertion portions 261, 271, 281, and 291 are arranged along the side surface 117A of the first cell. When the first cell 100A is rotated by 180° as illustrated in FIG. 17, the second lead tab 270 has the shape illustrated in FIG. 6.

When the first to fourth insertion portions 261, 271, 281, and 291 are arranged as illustrated in FIG. 2, the first to fourth insertion portions 261, 271, 281, and 291 are inserted into the first to fourth connection portions 360, 270, 380, 390, respectively, and then are sequentially welded together with the respective insertion portions in the order of the first connection portion 360, the second connection portion 370, the third connection portion 380, and the fourth connection portion 390. The first to third cells are electrically connected with the protection circuit module by sequentially welding the protection circuit module 300 to the plurality of lead tabs 260, 270, 280, and 290.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of electrically connected cells;
a protection circuit module electrically connected with the plurality of cells; and
a plurality of lead tabs configured to electrically connect the plurality of cells to the protection circuit module,
wherein the protection circuit module includes a plurality of connection portions, which is arranged in a row and connected with the plurality of lead tabs, respectively, and
the plurality of lead tabs overlaps in an order in which the plurality of connection portions is arranged,
wherein a first one of the electrically connected cells comprises:
a side surface, to which the protection circuit module is fixed, and
a terminal surface that comprises a plurality of electrode terminals,
wherein at least one of the lead tabs is configured to bend at a corner where the side surface and terminal surface meet.

2. The battery pack of claim 1, wherein the plurality of connection portions includes a first connection portion, a second connection portion, a third connection portion, and a fourth connection portion, which are arranged in the order, and
the plurality of lead tabs includes:
a first lead tab connected to the first connection portion;
a second lead tab, which overlaps on the first lead tab and is connected to the second connection portion;
a third lead tab, which overlaps on the second lead tab and is connected to the third connection portion; and
a fourth lead tab, which overlaps on the third lead tab and is connected to the fourth connection portion.

3. The battery pack of claim 1, wherein the plurality of cells further includes:
a second cell, which is disposed on the same plane as that of the first cell, and is serially connected with the first cell; and
a third cell, which is stacked on the second cell, and is serially connected with the second cell.

4. The battery pack of claim 3, wherein each of the plurality of cells includes a terminal surface provided with a first electrode terminal and a second electrode terminal, and
the terminal surface of the first cell and a terminal surface of the second cell face each other.

5. The battery pack of claim 3, wherein each of the plurality of cells includes a terminal surface provided with a first electrode terminal and a second electrode terminal, and
a terminal surface of the second cell and a terminal surface of the third cell are arranged in the same direction.

6. The battery pack of claim 2, wherein the first connection portion corresponds to a first electrode of the plurality of electrically connected cells, and
the fourth connection portion corresponds to a second electrode of the plurality of electrically connected cells.

7. The battery pack of claim 6, wherein the plurality of cells further includes:
a second cell, and
a third cell,
wherein a first electrode of the first cell is electrically connected with the first lead tab,
a second electrode of the first cell and a first electrode of the second cell are electrically connected by the second lead tab,
a second electrode of the second cell and a first electrode of the third cell are electrically connected by the third lead tab, and
a second electrode of the third cell is electrically connected with the fourth lead tab.

8. The battery pack of claim 7, wherein each of the first to fourth lead tabs is bent at the corner of the first cell.

9. The battery pack of claim 7, wherein the first to fourth lead tabs overlap each other on a side surface of the first cell, and a length of the first lead tab extending along the side surface of the first cell is largest, and a length of the fourth lead tab extending along the side surface of the first cell is smallest.

10. The battery pack of claim 9, wherein the first cell further includes:
a bottom surface positioned at an opposite side of the terminal surface,
wherein the side surface of the first cell is positioned between the terminal surface of the first cell and the bottom surface of the first cell.

11. The battery pack of claim 1, wherein a surface of each of the plurality of lead tabs is insulated and coated.

12. A battery pack, comprising:
at least a first, second and third electrically connected cells;
a protection circuit module electrically connected with the first, second and third cells; and
at least a first, second and third lead tabs configured to respectively electrically connect the first, second and third cells to the protection circuit module, the first, second and third lead tabs having a first, second and third lengths respectively with the second length being less than the first length and the third length less than the second length,
wherein the protection circuit module includes at least a first, second and third connection portions, which is arranged in a row and connected with the plurality of lead tabs, respectively, and
the first, second and third lead tabs overlapping with shorter lead tabs over lapping longer lead tabs,
wherein the first cell comprises a side surface, to which the protection circuit module is fixed, and a terminal surface that comprises a plurality of electrode terminals,
wherein at least one of the lead tabs is configured to bend where the side surface and terminal surface meet.

13. The battery pack of claim 12, wherein connection portions includes the first connection portion, the second connection portion, the third connection portion, and a fourth connection portion, which are arranged in the order, and
wherein the lead tabs includes:
the first lead tab connected to the first connection portion, the first lead tab having a first length;

the second lead tab, which overlaps on the first lead tab and is connected to the second connection portion, having a second length less than the first length;

the third lead tab, which overlaps on the second lead tab and is connected to the third connection portion, having a third length less than the second length; and a fourth lead tab, which overlaps on the third lead tab and is connected to the fourth connection portion, having a fourth length less than the third length.

14. The battery pack of claim 12, wherein the cells include:

the second cell, which is disposed on the same plane as that of the first cell, and is serially connected with the first cell; and the third cell, which is stacked on the second cell, and is serially connected with the second cell.

15. The battery pack of claim 14, wherein each of the first, second, and third cells includes a terminal surface provided with a first electrode terminal and a second electrode terminal, and the terminal surface of the first cell and a terminal surface of the second cell face each other.

16. The battery pack of claim 12, wherein each of the first, second and third cells includes a terminal surface provided with a first electrode terminal and a second electrode terminal, and a terminal surface of the second cell and a terminal surface of the third cell are arranged in the same direction.

* * * * *